Feb. 20, 1962 L. J. SCHMID ETAL 3,021,579
MOLD FOR MAKING COMPOSITE METAL BEARINGS
Filed March 19, 1957 2 Sheets-Sheet 1

INVENTORS
Leonard J. Schmid, &
BY Donald R. Scott
J. E. Ross
ATTORNEY

Feb. 20, 1962 L. J. SCHMID ETAL 3,021,579
MOLD FOR MAKING COMPOSITE METAL BEARINGS
Filed March 19, 1957 2 Sheets-Sheet 2
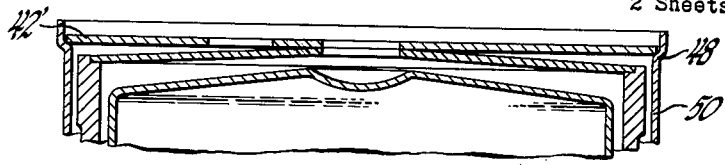
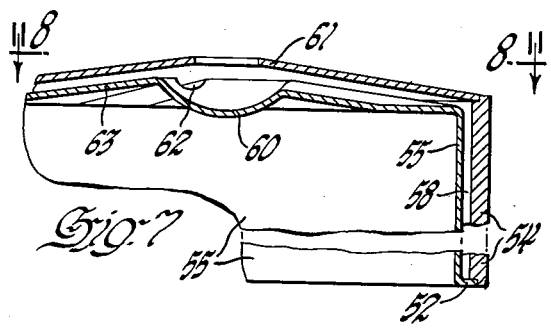
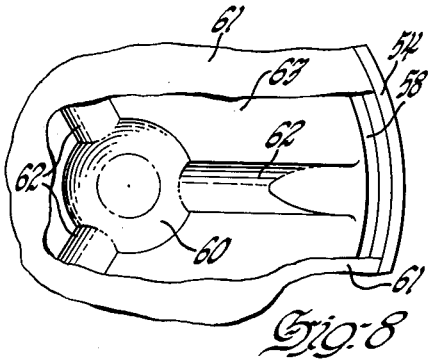
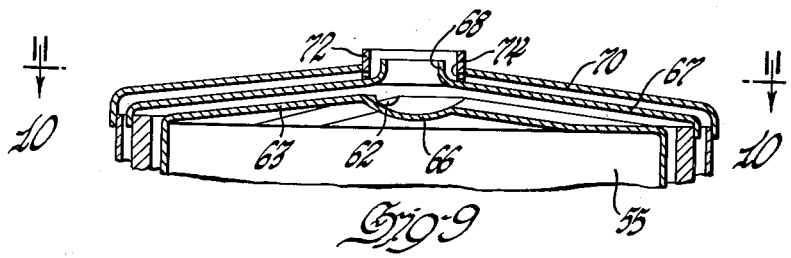
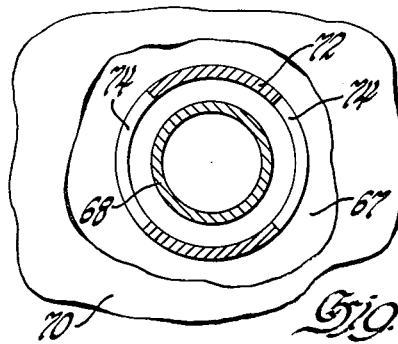
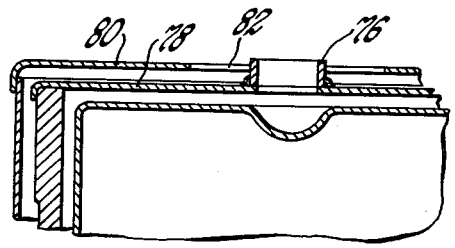
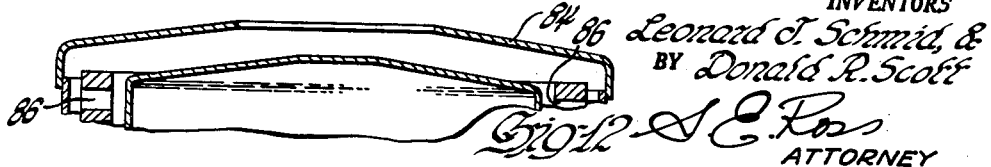
INVENTORS
Leonard J. Schmid, &
BY Donald R. Scott
ATTORNEY

United States Patent Office 3,021,579
Patented Feb. 20, 1962

3,021,579
MOLD FOR MAKING COMPOSITE
METAL BEARINGS
Leonard J. Schmid, Brownsburg, and Donald R. Scott, Indianapolis, Ind., assignors to General Motors Corporation, Detroit, Mich., a corporation of Delaware
Filed Mar. 19, 1957, Ser. No. 647,072
8 Claims. (Cl. 22—116)

This invention relates to a mold for casting linings on cylindrical members, particularly bearings, in which the lining material is cast-welded to a backing member or core of steel or other metal. The mold which is used to bond a plastic bronze lining on a cylindrical backing member comprises the backing member and a sheet metal cover therefore, together with an inverted cup-shaped member disposed within said backing member and spatially separated from the side walls thereof.

Large bronze-lined bearings have been cast for quite some time using a ceramic-type mold cover. These ceramic covers have served two functions. First, they retained the protective atmosphere from a preheat furnace within the mold cavity, thus preventing scaling of the bearing shells prior to the pouring of the molten lining metal into the mold. Secondly, they usually provided a pouring basin having channels extending therefrom which conveyed the molten lining material into the mold cavity. Use of ceramic as the cover material has two principal disadvantages. The ceramic-type mold cover is relatively expensive and, even though reusable, the number of castings that may be produced before deterioration or breakage of the cover is quite limited. Ceramic covers are also not advantageous in that fragments of the covers frequently fall into the casting cavity, thereby becoming entrapped in the bearing lining material and result in defective bearings. This problem increases with each reuse of the ceramic mold covering.

During the pouring of the lining metal into a mold having a ceramic cover, much of the lining metal splashes out of the pouring basin and is lost. Further loss of the lining metal occurs when it is spilled as the mold is transferred from the metal pouring station to the quenching station. Since the ceramic covers are reusable, it is necessary to treat and transfer the covers to the mold assembling station after each casting operation. Additionally, such a large amount of lining metal is spilled during the pouring and transfer steps that it is necessary to subsequently reclaim and refine this metal.

A principal object of this invention is to provide an expandable mold for use in casting metal linings on cylindrical members. A further object is to provide a mold for lining cylindrical members which prevents foreign particles from being introduced into the casting cavity. It is also an object of this invention to increase the production rate of making composite cylindrical members and to reduce the cost of manufacture of such members. A still further object of this invention is to provide a mold for the cast-welding of linings on cylindrical members which reduces the amount of lining material spilled and lost during metal pouring and transfer of the mold to the quenching station.

These and other objects are attained in accordance with the present invention with an expendable mold comprising an inverted cup-shaped member disposed within a cylindrical backing member so as to form a generally annular space therebetween. The cup-shaped member is secured throughout its circumference to the lower edge of the cylindrical member. A sheet material cover having an aperture therein is disposed over and vertically spaced from said cup-shaped member and supported by the upper edge of said cylindrical member. The mold provided by this invention is comparatively inexpensive and therefore expendable, eliminating the need for the handling of covers. The construction of the mold substantially eliminates spillage of the lining material from the mold during pouring and transfer of the mold to the quenching station, thereby eliminating the need of reclaiming and refining the lining material.

The rate of production of finished bearings is vastly increased by this invention since the greater heat conductivity of the sheet material as well as the thinness of the cover reduce the furnace preheat time of the mold by approximately 20%. The net production rate is further increased by the decrease in the number of finished bearings rejected due to imperfections in the lining caused by foreign particles in the mold cavity.

Further objects, advantages and features of the invention will appear more clearly from the following description of preferred embodiments thereof and from the drawings, in which:

FIGURE 6 is a fragmentary sectional view showing a modification of the mold illustrated in FIGURE 4 in which the outer cover is positioned on the outer cylindrical member by an offset in the outer cylindrical member;

FIGURE 7 is a fragmentary sectional view showing a mold in which a generally central depression in the upper wall of the cup-shaped member is formed and having three channels radially extending therefrom to the casting cavity;

FIGURE 8 is a fragmentary top view with parts broken away along the line 8—8 of FIGURE 7 showing the radially extending channels in the upper wall of the cup-shaped member;

FIGURE 9 is a fragmentary sectional view showing a modification generally similar to that illustrated in FIGURE 7 in which an outer sleeve and an outer cover are also employed for the casting of the inner and outer linings consecutively;

FIGURE 10 is a fragmentary top view along the line 10—10 of FIGURE 9, showing the slotted ring used to reduce turbulence in pouring the outer lining of the cylindrical member;

FIGURE 11 is a fragmentary sectional view showing a mold for the consecutive casting of both the inner and outer linings in which the cover has a generally central aperture for access to the inner casting cavity and the outer cover has a concentric opening for access to the outer casting cavity; and FIGURE 12 is a fragmentary sectional view showing a mold for the casting of both the inner and outer linings simultaneously in which no inner cover is employed. Two apertures are disposed in the upper portions of the backing member to permit overflow of casting metal from the inner to the outer casting cavity.

Figure 1:
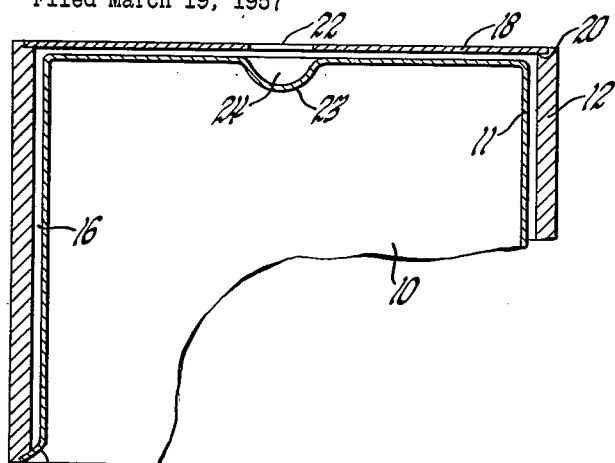
FIGURE 1 is a sectional view, with parts broken away, of an expendable mold having a flat cover generally equally spaced throughout its surface from the upper wall of the inverted cup-shaped member.

Referring more particularly to the drawings, the mold shown in FIGURE 1 for cast-welding an inner lining on a cylindrical member comprises an inverted cup-shaped member 10 disposed coaxially within the generally cylindrical bearing backing or reinforcing member 12 and having its side walls 11 generally spaced therefrom. The bottom end of the cup-shaped member is provided with an outwardly extending circumferential flange 14 secured throughout its circumference to the lower edge of the cylindrical member 12 to thereby form an imperforate lower wall to the generally annular casting cavity 16. A central portion 23 of the horizontal wall of the cup-shaped member 10 is depressed to form a pouring basin 24, which functions as a receiver for the casting metal and reduces turbulence as the metal enters the casting cavity. A sheet metal cover 18 is positioned on the upper edge of the cylindrical member 12 and extends into an annular offset 20 formed in that edge. A generally central aperture 22 in the cover provides access to the casting cavity 16. Those members of the mold described in the present invention other than backing or reinforcing member are preferably made from sheet steel. However, any suitable sheet material and particularly sheet metal can be used. The cylindrical reinforcing member used in making composite bearings is usually steel; however, any suitable material having the required characteristics can be used as a backing member to practice the invention.

Figure 2:
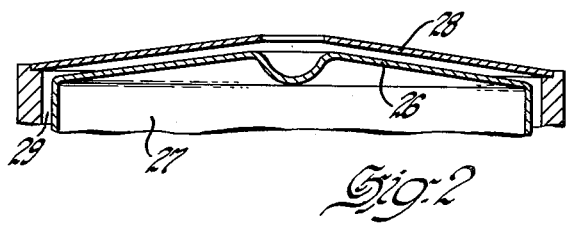
FIGURE 2 is a fragmentary sectional view showing a modification of FIGURE 1 in which both the upper wall of the cup-shaped member and the cover are conical.

FIGURE 2 shows a modification of the above-described mold in which the wall 26 of the inverted cup 27 is conical. A correspondingly conical sheet metal cover 28 is vertically spaced therefrom equally throughout its lateral extension. The conical structure of the cover provides the cover with added strength so that it will support its own weight and not sag when high melting point lining metals are poured into the mold. The conical structure of the wall 26 of the cup not only gives strength to the wall but aids in the flow and dispersion of the molten lining metal into the annular cavity 29.

Figure 3:
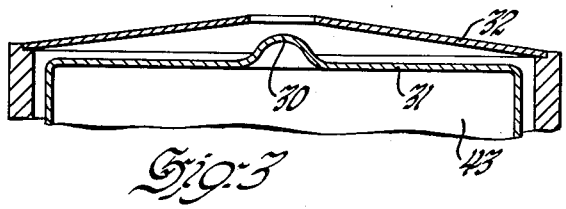
FIGURE 3 is a fragmentary sectional view showing a further modification of FIGURE 1 in which only the cover is conical.

In the modification of the mold shown in FIGURE 3, the horizontal wall 31 of the cup-shaped member 43 has a raised central portion 30 which serves to disperse the molten lining metal and reduce its turbulence during pouring. A conical cover 32 is vertically spaced from the wall 31.

Figure 5:
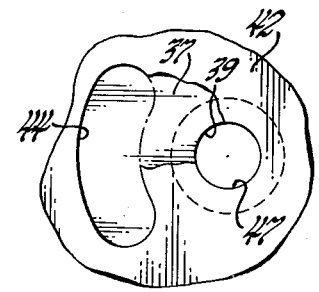
FIGURE 5 is a fragmentary top view along the line 5—5 of FIGURE 4, showing the central aperture in the outer mold cover, which provides access to the inner casting cavity, and an off-center aperture providing access to the outer casting cavity.
Figure 4:
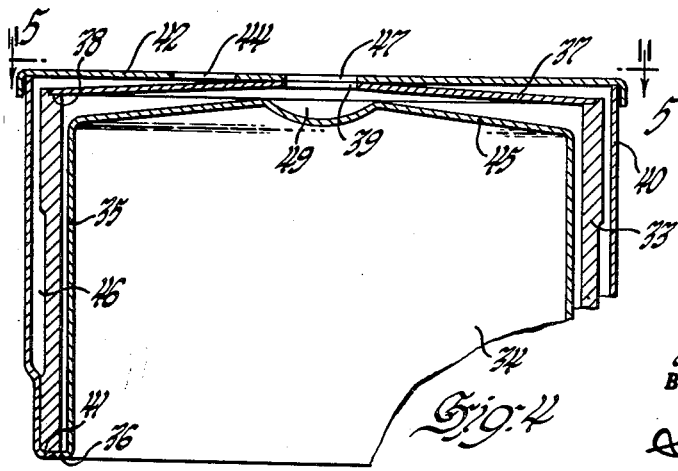
FIGURE 4 is a sectional view, with parts broken away, of a mold for casting both the inner and outer linings on a cylindrical member consecutively.

FIGURE 4 illustrates a mold in which both the inner and outer linings for a double-lined steel-backed bearing 33 can be poured consecutively. An inverted cup-shaped member 34 is disposed within and coaxial with a cylindrical bearing member 33, the side walls 35 of the cup-shaped member being laterally spaced from the bearing member. An outwardly extending flange 36 on the lower edge of the cup-shaped member is secured throughout its circumference to the lower edge of the bearing member 33 forming an imperforate lower wall. A casting cavity is thus formed between these members. An inner cover 37 is positioned in an offset 38 on the upper edge of the bearing member 33 over and vertically spaced from the conical wall 45 of the cup-shaped member 34. A central aperture 39 in the cover provides access to the casting cavity. An outer cylindrical sleeve 40 is located around and coaxial with the bearing member, this sleeve being spaced from the bearing member and having an inwardly extending flange 41 secured throughout its circumference to the lower edge of the bearing member 33. An outer cover 42 which is positioned over the upper edge of the sleeve 40, has a generally central aperture 47 registering with the aperture 39 in the inner cover and a second aperture 44 providing access between the annular outer casting cavity 46 and the atmosphere. FIGURE 5 illustrates more clearly the apertures 39 and 47, the depressed central portion 49 of the wall 45, and the other aperture 44 for providing access to the outer casting cavity. The modification shown in FIGURE 6 is generally similar to the mold illustrated in FIGURE 4. However, the outer cover 42' is supported over the inner cover by means of an offset 48 in the upper portion of the outer cylindrical member 50.

A mold for cast-welding of the inner lining on a bearing is shown in FIGURE 7 in which an inverted cup-shaped member 55 is placed within a cylindrical backing member 54 having its side walls spaced therefrom. The cup-shaped member 55 possesses an outwardly extending circumferential flange 52 which is secured to the lower edge of the bearing forming an imperforate lower wall to the casting cavity 58 defined by the members. A conical sheet metal cover 61 is located over and spaced from the conical upper wall of the cup-shaped member 55. In this modification, the conical wall 63 of the cup-shaped member has three upwardly concave channels or troughs 62 which extend radially from the depression forming the pouring basin 60, as shown in FIGURE 8, which serve to drain all the molten casting metal from the pouring basin. An adaptation of this modification for consecutively casting double-lined steel-backed bearings is shown in FIGURE 9 in which the conical wall 63 of the inner cup-shaped member 55 is provided with the radial channels 62 extending from the pouring basin 66. However, the inner cover 67 possesses a short drawn vertically extending tube 68 at its central aperture. The outer cover 70 is provided with an aperture concentric with that of the inner cover 67 and an annular member 72 slotted in its lower extremities is employed to reduce turbulence in pouring the outer lining.

FIGURE 10 is a cross-sectional view of the annular ring 72 through the slot 74 showing the slots 74 through which the lining metal flows while pouring the outer lining metal into the mold shown in FIGURE 9.

The inner members of the mold in FIGURE 11 are substantially the same as that shown in FIGURE 1 for casting the inner lining of a steel-backed bearing. However, the short vertical tube 76 has been added to the inner cover 78 to facilitate introduction of the metal into the inner casting cavity. The outer cover 80 has a central aperture 82 concentric with the aperture in the inner cover 78.

The above mold structures for the consecutive casting of double-lined steel-backed bearings are employed when the inner and outer lining metals are of different composition. FIGURE 12 illustrates a type of mold used for the cast-welding of double-lined bearings in which the composition of both the inner and outer linings are the same. Only the outer cover 84 is then required to maintain the protective atmosphere of the furnace. Two holes 86 are bored in the upper side wall portions of the bearing to permit overflow of the lining material from the inner casting cavity into the outer casting cavity. This adaptation provides a rapid, economical, and efficient method for the simultaneous casting of both the inner and outer linings.

Bearings prior to cast-welding of a lining metal are degreased and descaled according to the usual methods. The mold is then assembled and then heated. The mold of the present invention is assembled by inserting the flanged cup-shaped member within the bearing in an inverted position and welding the flange on the rim of the cup to the lower edge of the bearing. An offset in the lower edge of the bearing aids in positioning of the cup before welding. By welding the flange throughout its circumference to the bearing, an imperforate lower wall to the inner casting cavity is formed. It will be understood, of course, that the preferred embodiments of this invention illustrate a circumferential flange on the inner and outer members of the mold which effectively, when secured to the backing as a reinforcing member, forms an imperforate lower wall to the casting cavity defined by the members. It is apparent however that the flange need not necessarily be part of the inner or outer members but that the lower edge of the reinforcing member can have an analogous structure functioning similarly. Although the preferred method of securing the steel members together is by welding, any method can be used which will bond the metals to thereby provide the imperforate lower wall required for the casting cavity. The outer member of a mold for casting double-lined bearings is secured to the bearing shell in a similar manner. The covers for both the inner and outer casting cavities are not necessarily welded but held in position by annular offsets in the upper edges of the cylindrical members as in FIGURE 1 or by a downwardly extending circumferential flange on the cover as in FIGURE 9.

In order to prevent scaling and oxidation of the bearing surface after the cleaning operation, it is desirable to heat the mold assembly for a suitable time in a protective atmosphere. An adequate means by which the bearing mold assembly may be heated is a pusher hearth-type furnace. A suitable protective atmosphere which may be employed is an "exothermic" atmosphere comprising 12% to 16% hydrogen, 12% to 14% carbon monoxide, 3% to 6% carbon dioxide and the balance nitrogen. The dew point of this gaseous mixture is preferably kept approximately at 50° F. maximum. It is necessary to heat the mold assembly to a temperature of 2000° F. After heating for a suitable time, the mold is transferred to the casting station and the lining material poured into the mold cavities. In all the embodiments of the mold for cast-welding of the double-lined bearings, except in FIGURE 12, the outer lining is poured first. The mold is then conveyed to a quenching station where the mold is deposited on a hydraulic table which slowly lowers the mold into the cylindrical spray-chamber for quenching. After approximately two minutes within the quenching chamber, the mold is removed and allowed to cool to room temperature. In order to finish the bearings, the mold must be removed from around the bearing. Since the level of the casting metal has been metered so as not to attain a sufficient height in the mold to reach the mold covers, the latter may be readily lifted from the mold and discarded. The inner and outer members of the mold are subsequently removed by machining and the bearing finished for use. The employment of inner and outer covers is necessary where the compositions of the inner and outer bearing lining materials vary. A typical example of the composition of the inner lining for the bearing metal is an alloy formed of 2% to 4% tin, 23% to 27% lead and the balance copper. For the outer lining an alloy comprising 9% to 11% tin, 14% to 16% lead and the balance copper may be used. If, however, it is desired to employ a lining material for both the inner and outer surfaces of the bearing which has the same composition, the inner cover of the mold may be removed. As shown in FIGURE 12, holes 86 in the upper portions of the bearing enable the bearing metal to first fill the inner cavity and then overflow through the holes 86 to fill the outer mold cavity. It is to be understood that although it is preferable to have apertures in the upper wall of the reinforcing member, in this modification, this modification can be adapted to be employed without the apertures by merely allowing the molten lining material from the filled inner casting cavity to overflow the upper edge of the reinforcing member to fill the outer casting cavity. Thus, it is within the scope of this invention to employ both the use of two sheet metal covers in the manufacture of double-lined steel backed bearings or to use only one cover in the manufacture of same if the composition of the lining material is identical for both the inner and outer linings.

It is to be understood that while the preferred embodiments of the present invention have been described and illustrated herein, the invention is not limited thereby but is susceptible to changes in form and detail within the scope of the appended claims.

We claim:

1. A mold for use in casting a lining on a cylindrical member, said mold comprising an inverted cup-shaped member disposed within a cylindrical member and having its side walls generally uniformly spatially separated from the cylindrical member to define an annular casting cavity therebetween, said cup-shaped member being secured to the lower edge of the cylindrical member throughout its circumference thereby providing providing an imperforate lower wall for said cavity, and a sheet material cover having a generally central pouring aperture positioned over said cup-shaped member and vertically spaced therefrom.

2. A mold for use in casting an inner lining on a cylindrical member, said mold comprising an inverted metal cup-shaped member disposed within a cylindrical member and having its side walls generally uniformly spatially separated from the cylindrical member to define an annular casting cavity therebetween, said cup-shaped member provided with an outwardly extending circumferential flange secured to the lower edge of the cylindrical member throughout its circumference thereby providing an imperforate lower wall for said casting cavity, a sheet metal cover having a generally central pouring aperture positioned over said cup-shaped member and vertically spaced therefrom, said cover engaging the upper edges of said cylindrical member substantially throughout its circumference.

3. The mold as in claim 2 wherein the sheet metal cover is circular and engages the cylindrical member substantially throughout its circumference in an off-set in the upper edge of said cylindrical member.

4. A mold for use in casting inner and outer linings on a cylindrical bearing member; said mold comprising an inverted metal cup-shaped member disposed within a cylindrical bearing member and having generally cylindrical side walls generally uniformly spatially separated from the cylindrical bearing member to define an annular casting cavity therebetween, said cup-shaped member provided with an outwardly extending circumferential flange secured to the lower edge of the cylindrical bearing member throughout its circumference thereby providing an imperforate lower wall for said casting cavity, a sheet metal cover having a generally central aperture positioned over said cup-shaped member and vertically spaced therefrom, said cover engaging the upper edges of said cylindrical bearing member throughout its circumference, a second cylindrical member disposed around the first, the side walls of said cylindrical members generally uniformly spatially separated and an inwardly extending circumferential flange provided on the lower edge of the outer cylindrical member, said flange secured to the lower edge of said inner cylindrical member throughout its circumference to form a generally annular imperforate outer casting cavity, and an outer sheet metal cover located over the inner cover, said outer cover being positioned on the upper edge of the outer cylindrical member, said outer cover having a central aperture concentric with the aperture of the inner cover and providing thereby an access to both the inner and outer casting cavities defined by said members.

5. A mold for use in casting an inner lining on a cylindrical bearing member, said mold comprising an inverted cup-shaped member disposed within and coaxial with a cylindrical bearing member and having its side walls generally uniformly spatially separated from the cylindrical bearing member to define an annular casting cavity therebetween, an outwardly extending circumferential flange on said cup-shaped member secured to the lower edge of the cylindrical bearing member throughout its circumference thereby providing an imperforate lower wall for said annular casting cavity, a sheet metal cover in substantial circumferential contact with the upper edge of said cylindrical bearing member, a centrally located aperture in said cover, a depression in the substantially horizontal portion of said member in register with said aperture and channels radially extending from said depression to said casting cavity.

6. A mold for use in casting inner and outer metal linings on a cylindrical bearing member, said mold comprising an inveted cup-shaped member disposed within and coaxial with a cylindrical bearing member and having its side walls generally uniformly spatially separated from the cylindrical bearing member to define an annular casting cavity therebetween, said cup-shaped member provided with an outwardly extending circumferential flange secured to the lower edge of the cylindrical bearing member throughout its circumference thereby providing an imperforate lower wall for said casting cavity, a second cylindrical member disposed around the first, the side walls of said cylindrical members generally uniformly spatially separated, an inwardly extending circumferential flange provided on the outer cylindrical member, said flange secured to the lower edge of said inner cylindrical member throughout its circumference thereby forming the generally annular imperforate casting cavity, and a sheet metal cover placed over the cylindrical member circumferentially engaging the upper edges of the outer cylindrical member and vertically spaced from said cup-shaped member, said cover having a generally central aperture thereby providing access to both the inner and outer casting cavities defined by said members.

7. A mold for use in casting linings on a cylindrical bearing member, said mold comprising an inverted cup-shaped member disposed within and coaxial with a cylindrical bearing member and having its side walls generally uniformly spatially separated from the cylindrical bearing member to define an annular casting cavity therebetween, said cup-shaped member secured to the lower edge of the cylindrical bearing member throughout its circumference to provide an imperforate lower wall for said cavity, and a sheet metal cover having a generally central pouring aperture positioned over said cup-shaped member and vertically spaced therefrom, said cover engaging the upper edges of said cylindrical bearing member throughout its circumference.

8. A mold for use in casting inner linings on a cylindrical member, said mold comprising an inverted metal cup-shaped member disposed within a cylindrical member and having generally cylindrical side walls generally uniformly spatially separated from the cylindrical member to define an annular casting cavity therebetween, said cup-shaped member provided with an outwardly extending circumferential flange secured to the lower edge of the cylindrical member throughout its circumference thereby providing an imperforate lower wall for said casting cavity, a conical sheet metal cover having a generally central aperture positioned over said cup-shaped member and vertically spaced therefrom, said cover engaging the upper edges of said cylindrical member throughout its circumference, a second cylindrical member disposed around the first, the side walls of said cylindrical members generally uniformly spatially separated and an inwardly extending circumferential flange provided on the lower edge of the outer cylindrical member, said flange secured to the lower edge of said inner cylindrical member throughout its circumference to form a generally annular imperforate outer casting cavity, and a sheet metal outer cover placed over the inner cover, said outer cover spaced vertically from said inner cover at its circumferential extremities, said outer cover having a generally central aperture coincidental with the aperture in the inner cover and an off-center aperture.

References Cited in the file of this patent
UNITED STATES PATENTS

| | | |
|---|---|---|
| 19,178 | Shanks | Aug. 31, 1896 |
| 735,596 | Sauveur et al. | Aug. 4, 1903 |
| 1,810,913 | Hawkins | June 23, 1931 |
| 2,030,726 | Strock | Feb. 11, 1936 |
| 2,489,280 | Floia | Nov. 29, 1949 |
| 2,621,381 | Johnson | Dec. 16, 1952 |
| 2,645,829 | Johnson | July 21, 1953 |
| 2,908,056 | Schmid | Oct. 13, 1959 |

FOREIGN PATENTS

| | | |
|---|---|---|
| 8,730 | Great Britain | 1892 |
| 173,014 | Germany | July 7, 1906 |
| 335,758 | France | Dec. 15, 1903 |
| 842,556 | France | Mar. 6, 1939 |